US012761472B2

(12) United States Patent
Ben Nachouane

(10) Patent No.: US 12,761,472 B2
(45) Date of Patent: Oct. 13, 2026

(54) IMAGE GENERATING DEVICE AND HEAD-UP DISPLAY COMPRISING SUCH A DEVICE

(71) Applicant: VALEO COMFORT AND DRIVING ASSISTANCE, Créteil (FR)

(72) Inventor: Ayoub Ben Nachouane, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 252 days.

(21) Appl. No.: 18/293,115

(22) PCT Filed: Jul. 28, 2022

(86) PCT No.: PCT/EP2022/071287
§ 371 (c)(1),
(2) Date: Jan. 29, 2024

(87) PCT Pub. No.: WO2023/006927
PCT Pub. Date: Feb. 2, 2023

(65) Prior Publication Data

US 2025/0085535 A1 Mar. 13, 2025

(30) Foreign Application Priority Data

Jul. 30, 2021 (FR) ....................................... 2108291

(51) Int. Cl.
*G02B 27/01* (2006.01)

(52) U.S. Cl.
CPC ..... *G02B 27/0101* (2013.01); *G02B 27/0149* (2013.01); *G02B 2027/0118* (2013.01); *G02B 2027/0127* (2013.01)

(58) Field of Classification Search
CPC ............ G02B 27/0101; G02B 27/0149; G02B 2027/0118; G02B 2027/0127; G02F 1/133385; H04N 9/3144
See application file for complete search history.

(56) References Cited

U.S. PATENT DOCUMENTS

2009/0086171 A1* 4/2009 Sun ...................... H04N 9/3144 359/223.1
2015/0029472 A1* 1/2015 Lin ...................... H04N 9/3144 353/56

(Continued)

FOREIGN PATENT DOCUMENTS

EP 3663813 A1 6/2020
FR 3105451 A1 6/2021

(Continued)

OTHER PUBLICATIONS

International Search Report in corresponding International Application No. PCT/EP2022/071287, dated Nov. 15, 2022 (5 pages).

(Continued)

*Primary Examiner* — Mariam Qureshi
(74) *Attorney, Agent, or Firm* — Osha Bergman Watanabe & Burton LLP

(57) ABSTRACT

An image generating device is disclosed having a light source configured to produce an upstream light beam, and an array of elements with variable transmittance configured to selectively receive and transmit the upstream light beam so as to form a downstream light beam forming an image. A downstream face of the array of variable transmittance elements is in contact with an at least partially transparent plate configured to limit heating of the array of variable transmittance elements. A downstream face of the partially transparent plate is in contact with a cold face of a thermoelectric cooling module.

12 Claims, 5 Drawing Sheets

(56) References Cited

U.S. PATENT DOCUMENTS

| | | | | |
|---|---|---|---|---|
| 2020/0298707 | A1* | 9/2020 | Suzuki | H05K 7/20336 |
| 2021/0033916 | A1* | 2/2021 | Uchimi | G09G 3/36 |
| 2021/0289672 | A1* | 9/2021 | Ichikawa | B60K 35/80 |
| 2021/0381900 | A1* | 12/2021 | Carr | G01J 3/42 |
| 2022/0276521 | A1* | 9/2022 | Hada | G02B 7/008 |

FOREIGN PATENT DOCUMENTS

| | | | |
|---|---|---|---|
| FR | 3105452 | A1 | 6/2021 |
| JP | H03-288187 | A | 12/1991 |
| JP | 2013-073186 | A | 4/2013 |

OTHER PUBLICATIONS

Written Opinion in corresponding International Application No. PCT/EP2022/071287, dated Nov. 15, 2022 (7 pages).
Office Action issued in corresponding China Application No. 202280053033.5, dated Jun. 18, 2026. (14 pages).

* cited by examiner

[Fig. 1]
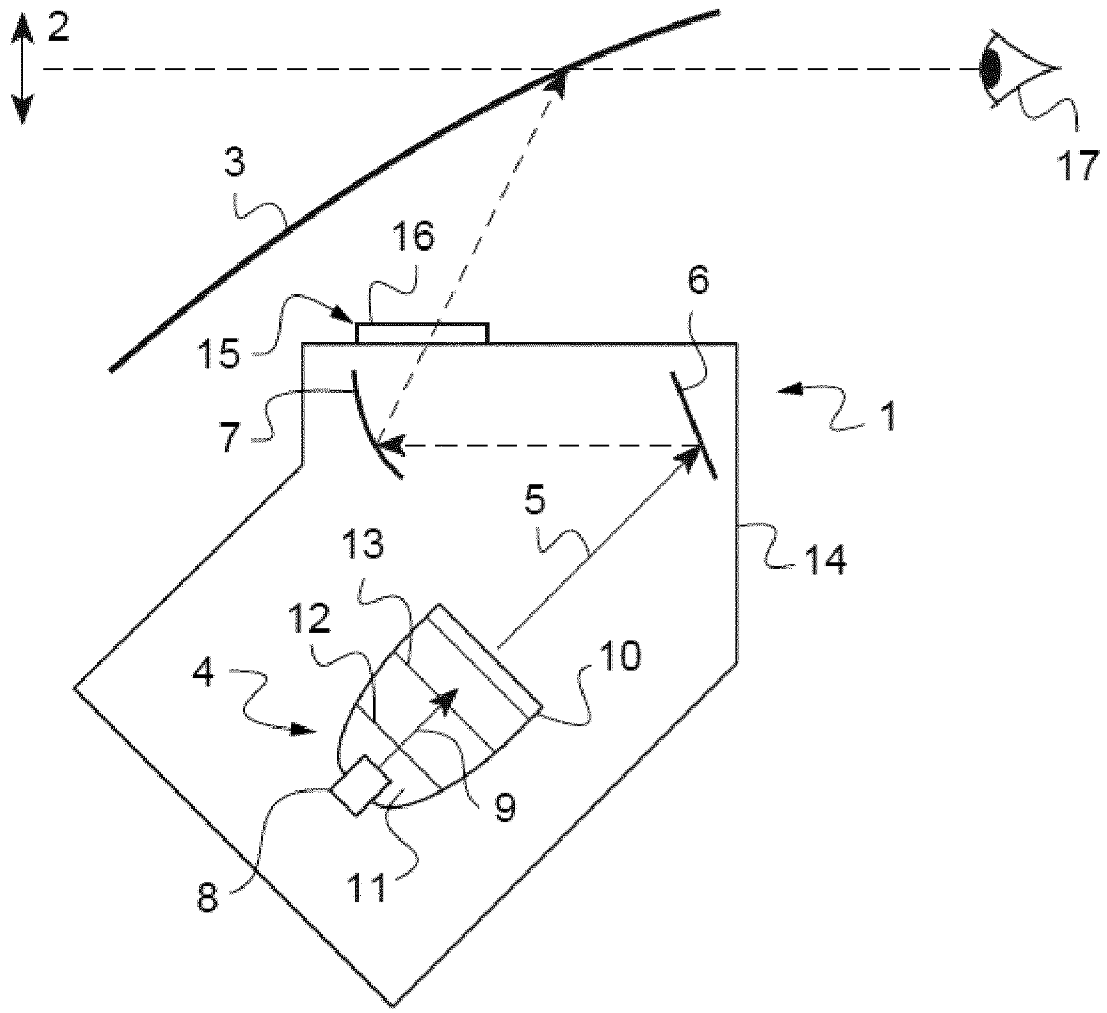

[Fig. 2]
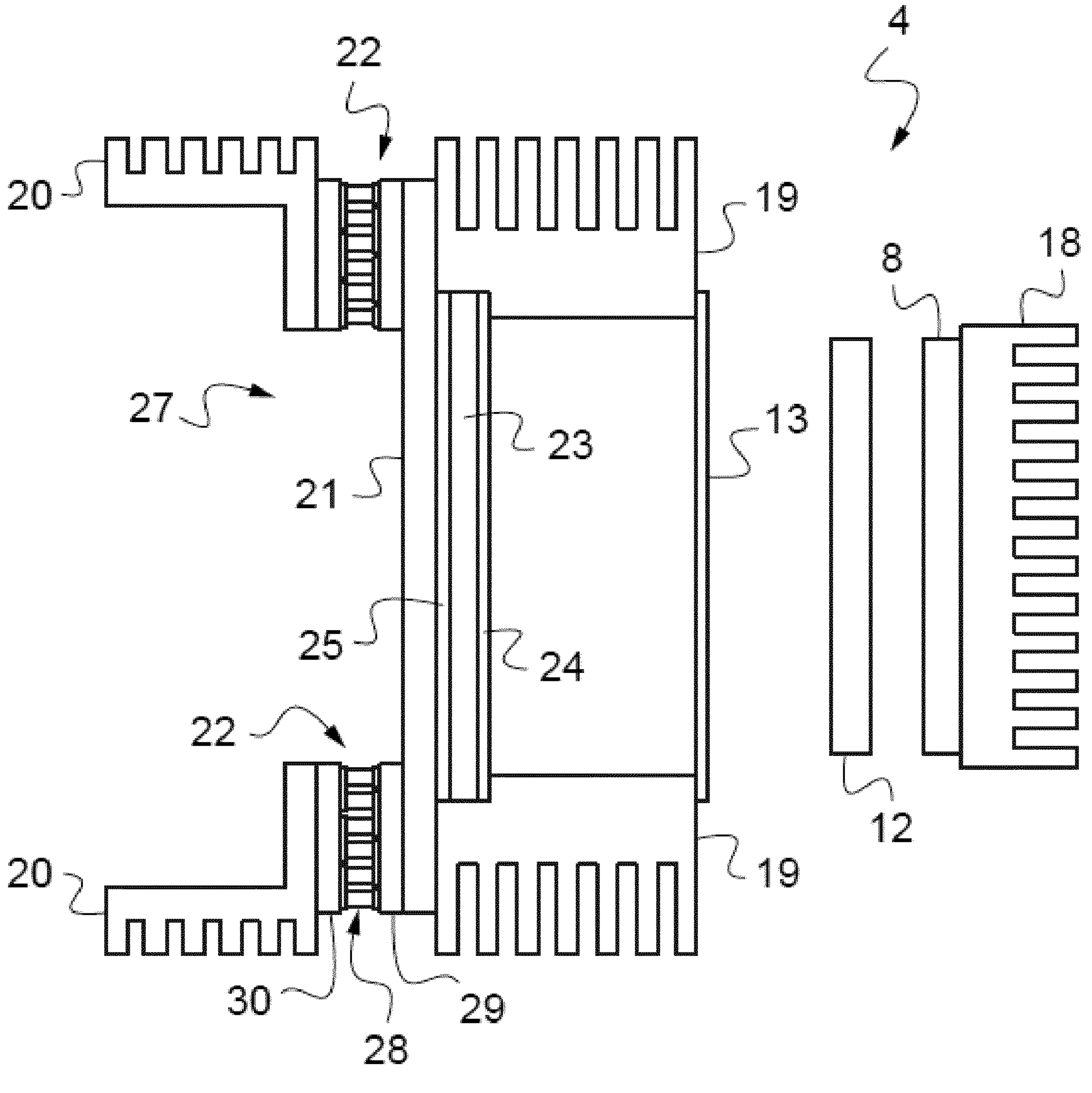

[Fig. 3]
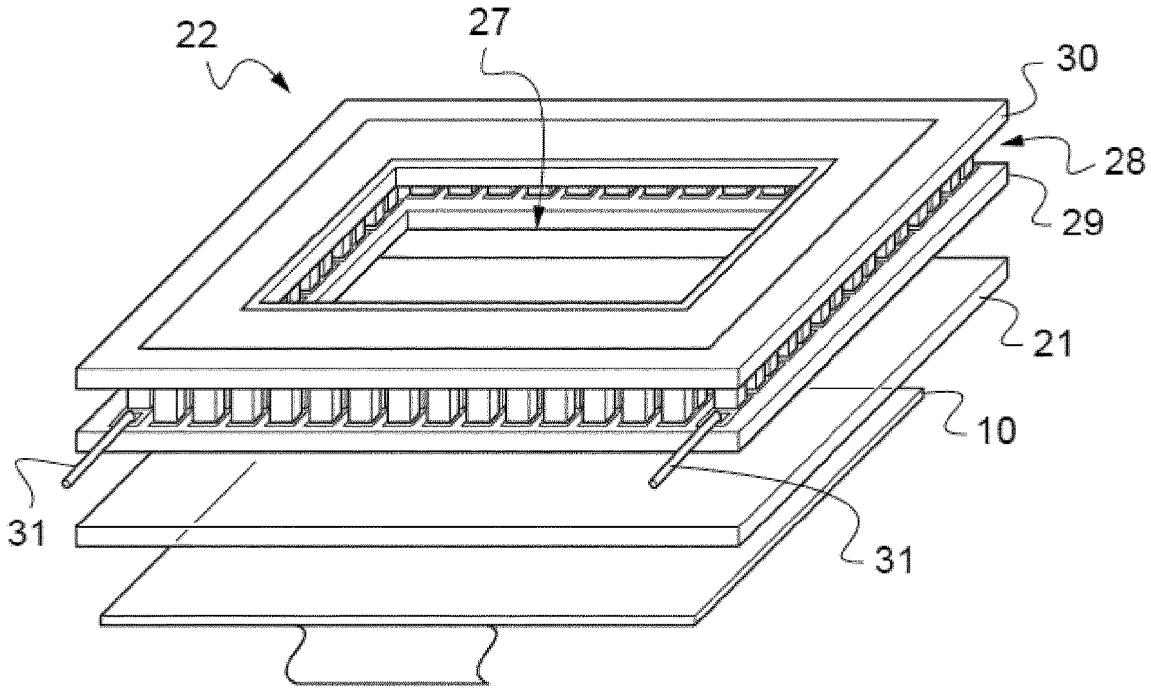
[Fig. 4]
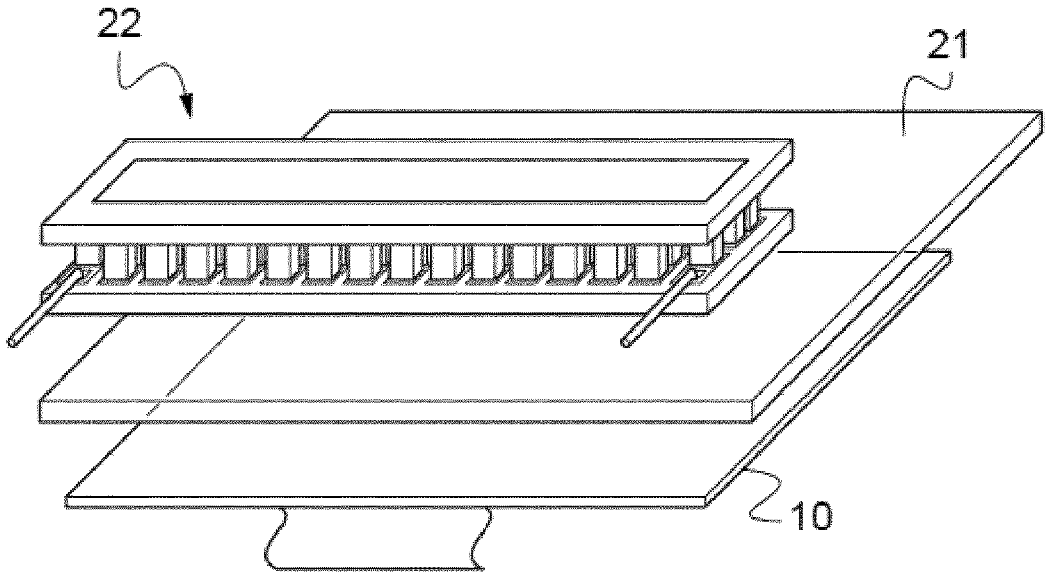

[Fig. 5]
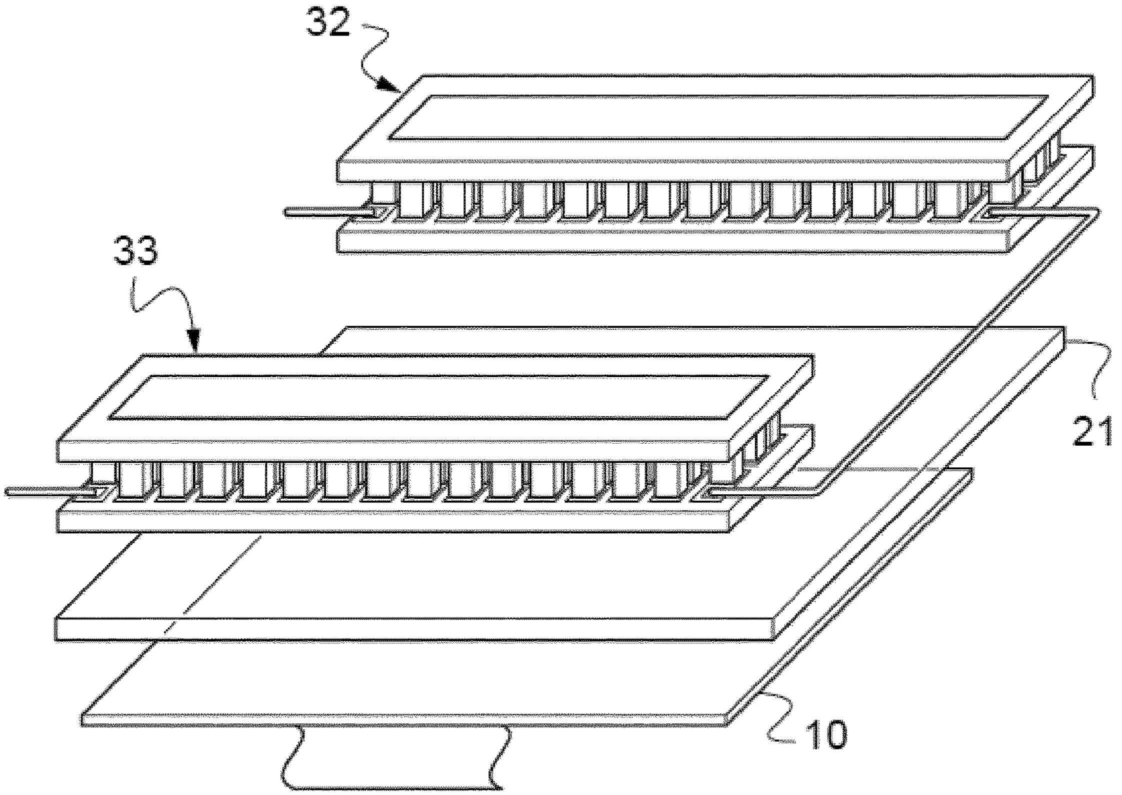

[Fig. 6]
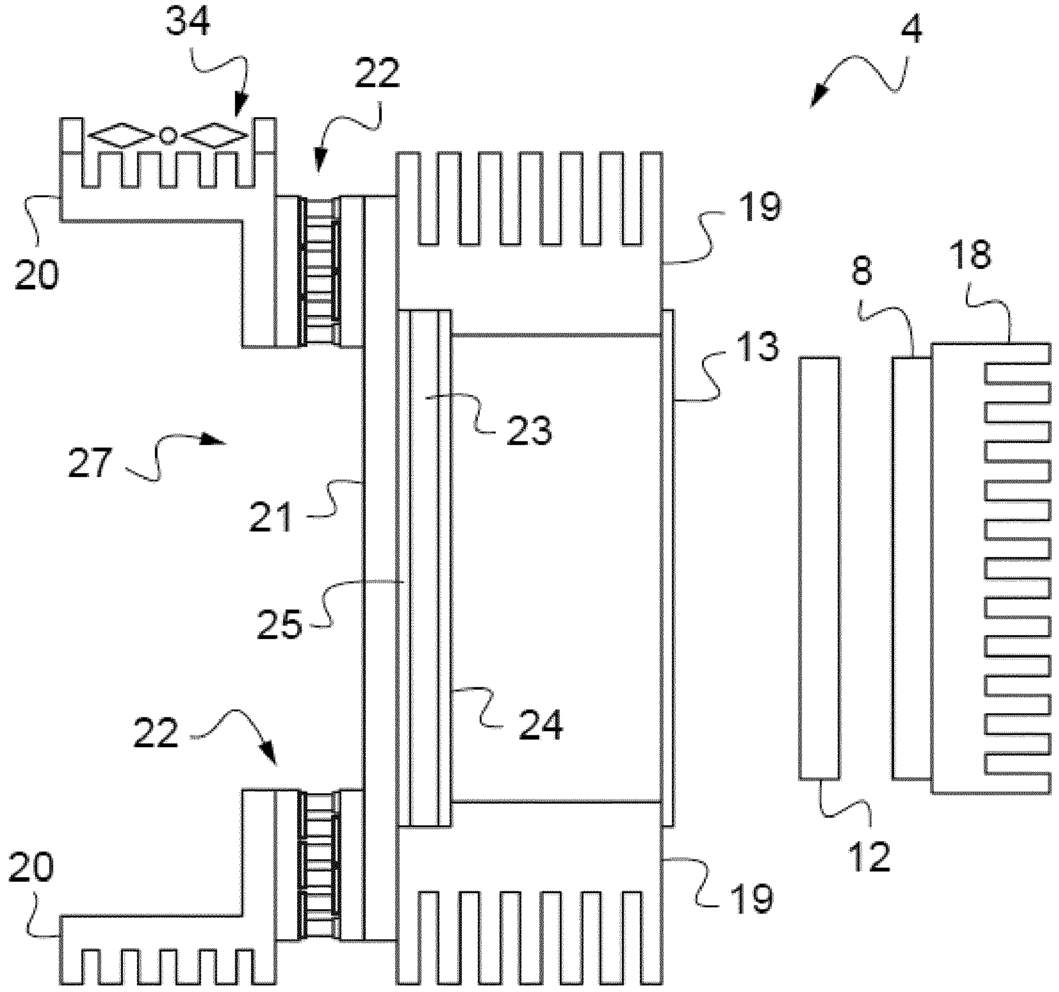

IMAGE GENERATING DEVICE AND HEAD-UP DISPLAY COMPRISING SUCH A DEVICE

TECHNICAL FIELD

The present invention relates to the technical field of display systems, notably the technical field of image projection systems.

The invention more specifically relates to an image generation device, notably suitable for use in a head-up display of a motor vehicle, and a head-up display comprising such a device.

TECHNOLOGICAL BACKGROUND

In the above field, a head-up display is a device which makes it possible to display driving-assistance information in the field of vision of the driver.

To this end, head-up displays comprise an image generation device, for example, a light source coupled to an array of elements with variable transmittance, for example, a liquid-crystal display (LCD), and an optical system for transmitting this image to a partially transparent strip, for example, in order for the driver to be able to see the images without looking away from the road.

There is a need for head-up displays which display images in augmented reality. Such displays must be configured to display an image of higher luminosity, at a greater distance. Besides the greater power of the imaging system, such displays comprise optical systems making magnification ratios greater than those of conventional displays possible.

The high power necessary to these displays causes a great increase in temperature of the image generation device. Besides, the optical system, which magnifies the images projected in the field of vision of the driver may, when it is exposed to sun rays, focus these rays on the image generation system, in particular on the LCD screen, then causing a great increase of the temperature. Too great an increase of the temperature of the image generation device, produced by the light source or by the sun rays, may degrade it irreversibly.

SUMMARY OF THE INVENTION

The invention proposes a solution to the aforementioned problems, providing a head-up display which is more robust against temperature increases.

According to one aspect of the invention, an image generation device is proposed, comprising a light source configured to produce an upstream light beam and an array of elements with variable transmittance which is configured to selectively receive and transmit the upstream light beam so as to form a downstream light beam forming an image, a downstream side of the array of elements with variable transmittance being in contact with an at least partially transparent plate configured to limit heating of the array of elements with variable transmittance, wherein a downstream side of the partially transparent plate is in contact with a cold side of a thermoelectric cooling module.

Within the meaning of the invention, the terms "upstream" and "downstream" refer to positions along the propagation path of the light emitted by the light source. Thus, the term "downstream" means closer to the light source and the term "upstream" means further from the light source, along the propagation path.

The combination of the at least partially transparent plate and the thermoelectric cooling module advantageously ensures the heat accumulated by the array of elements with variable transmittance is discharged correctly. Thus, the image generation device better resists high temperatures, notably temperatures resulting from the passing of the light beam through the array of elements with variable transmittance and/or sun rays focused on the array of elements with variable transmittance.

According to one embodiment, the thermoelectric cooling module is in contact with a peripheral area of the downstream side of the at least partially transparent plate so as to leave a central area of the at least partially transparent plate free, making it possible for the downstream light beam to pass.

According to one embodiment, the thermoelectric cooling module is in contact with a peripheral area of the downstream side of the at least partially transparent plate so as to delimit the central area.

What is meant by "delimit" here is that the cooling module defines the whole outline of the central area, and not only part of it.

According to one embodiment, the device comprises several thermoelectric cooling modules, the cold sides of which are in contact with the peripheral area of the downstream side of the partially transparent plate.

According to one embodiment, the thermoelectric cooling modules are electrically coupled in series.

Coupling the modules in series makes it possible to limit the electrical connections and to simplify control of cooling of the device.

According to one embodiment, the thermoelectric cooling module comprises a hot side opposite the cold side, the hot side being in contact with a heat sink.

According to one embodiment, the device comprises an optical diffuser situated between the light source and the array of elements with variable transmittance, the optical diffuser and the array of elements with variable transmittance being coupled to a heat sink acting as a support for the optical diffuser and for the array of elements with variable transmittance.

According to one embodiment, the at least partially transparent plate extends beyond the outlines of the screen, the upstream side of the at least partially transparent plate being in contact with the heat sink acting as a support.

According to one embodiment, at least one heat sink is coupled to a forced-convection cooling module.

According to one embodiment, the array of elements with variable transmittance is a liquid-crystal display.

According to one embodiment, the at least partially transparent plate is an at least partially transparent ceramic plate.

According to another aspect of the invention, a head-up display is proposed, notably for a motor vehicle, comprising an image generation device according to the invention.

Of course, the various features, alternative embodiments and embodiments of the invention may be associated with one another in various combinations insofar as they are not incompatible or mutually exclusive.

BRIEF DESCRIPTION OF THE FIGURES

In addition, various other features of the invention become apparent from the appended description, which is provided with reference to the drawings, which illustrate non-limiting embodiments of the invention, and in which:

FIG. 1 schematically illustrates a head-up display comprising an image generation device according to one embodiment of the invention, FIG. 2 illustrates an image generation device according to one embodiment of the invention, FIG. 3 illustrates a thermoelectric module of the image generation device of the embodiment of FIG. 2, FIG. 4 illustrates one variant embodiment of the thermoelectric module of FIG. 3, FIG. 5 illustrates another variant embodiment of the thermoelectric module of FIG. 3, and FIG. 6 illustrates one variant embodiment of an image generation device according to the invention.

It should be noted that in these figures the structural and/or functional elements common to the various variants may have the same reference signs.

DETAILED DESCRIPTION

FIG. 1 schematically shows the main elements of a head-up display 1 intended, for example, to be fitted to a vehicle, notably a motor vehicle.

Such a display 1 is suitable for creating a virtual image 2 in the field of view of a driver of the vehicle, such that the driver can see this virtual image 2 and any information which it contains without having to look away.

To this end, the display 1 comprises a partially transparent strip 3 placed in the field of view of the driver, an image generation device 4 suitable for generating a downstream light beam 5 and a projection device 6, 7 suitable for reflecting, in the direction of said partially transparent strip 3, the downstream light beam 5 generated by the image generation device 4.

The partially transparent strip 3 is in this case coincident with the windscreen of the vehicle. In other words, it is the windscreen of the vehicle which has the function of a partially transparent strip for the head-up display 1. This configuration is particularly suitable for projecting images in augmented reality.

As a variant, the partially transparent strip might be a combiner, i.e., a partially transparent strip distinct from the windscreen and dedicated to the head-up display. Such a combiner would be placed between the windscreen of the vehicle and the eyes 15 of the driver, on the route of the downstream light beam 5.

The projection device comprises in this case two folding mirrors 6, 7 arranged so as to reflect the downstream light beam 5 generated by the image generation device 4 in the direction of the partially transparent strip 3. The folding mirrors 6 and 7 advantageously make it possible to place the image generation device 4 in a configuration in which it does not face the partially transparent strip 3 and therefore to place it in any suitable place, typically under the dashboard of the vehicle.

For example, in this case, a first folding mirror 6 is a flat mirror and a second folding mirror 7 is a curved mirror which assumes a shape optimized for producing a virtual image suitable for the partially transparent strip 3, in this case a curved shape, so as to display the image undistortedly. Besides, the second folding mirror 7 has a function of magnifying the image generated by the array of elements with variable transmittance.

According to other embodiments, the image projection device 4 might comprise a different number of mirrors and/or mirrors having different shapes, as well as other optical elements, for example a lens.

The image generation device 4 comprises a light source 8, here an array of light-emitting diodes (LED being the acronym conventionally used by a person skilled in the art), which is configured to produce an upstream light beam 9, an array of elements with variable transmittance 10 which is configured to be illuminated by the upstream light beam 9 and a reflector 11 which is interposed between the light source 8 and the array of elements with variable transmittance 10. In this case, the image generation device 4 comprises an optical collimator 12 and an optical diffuser 13 through which the downstream light beam 9 passes before reaching the array of elements with variable transmittance.

The array of elements with variable transmittance 10 is configured to selectively transmit the upstream light beam 9 so as to form the downstream light beam 5 representing the image 2 to be projected in the field of view of the driver by means of the partially transparent strip 3.

The head-up display device also comprises a (generally opaque) casing 14 which contains the image generation device 4 and the projection system 6, 7 in order, notably, to protect these elements against any external attacks (dust, liquids, etc.).

The casing 13 comprises an opening 15 through which the downstream light beam passes, in this case after being reflected on the second folding mirror 7.

The opening 15 in the casing 13 is closed by a window 16 (sometimes designated by the term "cover window") formed, for example, from a sheet of polycarbonate plastic of a thickness of between 0.25 mm and 0.75 mm.

FIG. 2 is a schematic view in which the image generation device 4 appears in more detail than in FIG. 1. In particular, FIG. 2 schematically shows a heat dissipation system of the image generation device 4.

In the embodiment of FIG. 2, the heat dissipation system comprises a combination of passive heat sinks 18, 19, 20, in this case "finned heat sinks", a partially transparent dissipative plate 21, and a thermoelectric cooling module 22, or Peltier module.

The array of elements with variable transmittance 10 is in this case a liquid-crystal display (LCD being the acronym used by a person skilled in the art), comprising an array 23 of liquid-crystal elements which is placed between a first polarizer 24 (upstream polarizer) forming an upstream side of the array of elements with variable transmittance, and a second polarizer 25 (downstream polarizer) forming a downstream side of the array of elements with variable transmittance.

A first passive heat sink 18 is attached to a rear side of the light source 8 and makes it possible to discharge the heat directly generated by the light source 8. The first passive heat sink 18 is in this case configured to keep the junction temperature of the light source below its functional thermal limits, in this case below a temperature of 110° C. Thus, the conductivity of the material of the first passive heat sink 18 is greater than 20 $W \cdot m^{-1} \cdot K^{-1}$, and preferably greater than 60 $W \cdot m^{-1} \cdot K^{-1}$. For example, in this case, the first heat sink is made of aluminum and has a thermal conductivity of 220 $W \cdot m^{-1} \cdot K^{-1}$.

The side of the first passive heat sink 18 which is directly in contact with the light source 8 is flat or substantially flat, and the opposite side is provided with fins that allow the surface area of the first passive heat sink 18 that is in contact with the air to be increased and therefore allow heat exchanges with the outside to be increased.

In order to improve the thermal coupling between the light source and the first passive heat sink 18, in particular if one or the other of the contact sides between the light source 8 and the sink is not perfectly flat and has, for example, differences in level which are greater than 0.1 mm, the coupling may be achieved by means of a thermal interface material, for example, thermal adhesive, thermal pads, a phase-change material, etc.

In order to improve heat dissipation and to ensure the first passive heat sink is well-protected against corrosion, the first heat sink 18 is in this case covered with an anodization layer.

A second passive heat sink 19 is in this case placed between the optical diffuser 13 and the array of elements with variable transmittance 10 and makes it possible to discharge the heat confined between the optical diffuser 13 and the array of elements with variable transmittance 10. In this case, the second heat sink is placed in the continuation of the reflector (which is not shown), for example so that the optical diffuser 13 is held by being fastened between the reflector and the second passive heat sink 19.

The array of elements with variable transmittance 10 is in this case placed in a recess in the second heat sink 19, so that the second passive heat sink is in contact with the groove and/or with a peripheral area of the upstream side of the array of elements with variable transmittance 10 (a peripheral area of the first polarizer 24), and/or with a downstream side of the diffuser 13. The depth of the recess is equal or substantially equal to the thickness of the array of elements with variable transmittance so that the downstream side of the array of elements with variable transmittance and a downstream side of the second passive heat sink 19 are substantially in the same plane.

The outer surface of the second passive heat sink 19 is provided with fins and its inner surface is not provided with fins and substantially continuous.

In this case, the material of the second passive heat sink 19 is advantageously chosen so that the ratio of the thermal conductivities of the first polarizer and of the material of the second heat sink is equal to 1 or close to 1. For example, the second heat sink 19 is made from aluminum, which has a thermal conductivity of 220 $W \cdot m^{-1} \cdot K^{-1}$.

In this example, the inner surface of the second heat sink 19 is painted in a dark or matte color in order to reduce stray reflections.

In other embodiments, the inner surface of the second heat sink 19 is covered with a reflective coating in order to avoid the virtual image 2 being degraded, notably at the edges of the virtual image 2.

The partially transparent plate 21 is in this case configured to drain the heat from the array of elements with variable transmittance. Thus, the upstream side of the partially transparent plate 21 is in this case in contact with the downstream side of the array of elements with variable transmittance 10 (in contact with the second polarizer 25) and/or with the downstream side of the second passive heat sink 19. Thus, the partially transparent plate 21 is thermally coupled to the array of elements with variable transmittance 10 and/or thermally coupled to the second passive heat sink 19. The heat may thus circulate from the array of elements with variable transmittance 10 outward via the partially transparent plate 21 then via the second heat sink 19.

The partially transparent plate 21 in this case is a ceramic plate and in this example has thermal conductivity of more than 5 $W \cdot m^{-1} \cdot K^{-1}$, and preferably of more than 10 $W \cdot m^{-1} \cdot K^{-1}$.

Preferably, the thickness of the partially transparent plate 21 (and therefore the thickness of the recess) is less than or equal to 1.1 mm, and even more preferably between 0.5 mm and 0.9 mm, in this case 0.7 mm.

The partially transparent plate 21 protrudes on either side of the array of elements with variable transmittance 10 by, for example, more than 4 mm, preferably more than 6 mm.

The thermoelectric module 22 makes it possible to drain the heat from the partially transparent plate. It is in this case placed so that its cold side is in thermal contact with the downstream side of the partially transparent plate 21, and in particular, in this case, with a peripheral area of the downstream side of the partially transparent plate 21, opposite an unutilized (or not optically useful) area of the array of elements with variable transmittance 10, so as to leave a central area 27 of the partially transparent plate 21, opposite a utilized (or optically useful) area of the array of elements with variable transmittance 10, free.

The arrangement of the array of elements with variable transmittance 10, of the partially transparent plate 21 and of the thermoelectric module 22 is illustrated by FIG. 3, which is an exploded view of its three elements.

In this case, the thermoelectric module 22 is in the shape of a square, or of rectangular shape, so as to delimit the central area 27, that is to say so as to define the outline thereof.

The thermoelectric module 22 comprises, in this case, a plurality 28 of semiconductor elements which are electrically connected in series by copper traces, thermally connected in parallel, and sandwiched between two metallized ceramic plates 29, 30. The plurality 28 of semiconductor elements may comprise, without, however, being limited thereto, bismuth telluride ($Bi_2Te_3$), lead telluride (PbTe), a silicon-germanium alloy (SiGe) or indeed bismuth antimonide (BiSb). Preferably, the thermoelectric module 22 is based on bismuth telluride so as to optimize its cooling capacity.

The dimensions of the thermoelectric module 22 depend on those of the array of elements with variable transmittance 10, and in particular of the utilized area and unutilized area of the array of elements with variable transmittance 10. The thickness of the thermoelectric module is preferably less than or equal to 5 mm, for example less than 3 mm.

In operation, applying an electric voltage between the terminals 31 of the thermoelectric module 22 makes it possible for heat to circulate between a first metallized ceramic plate 29, which forms a cold side of the thermoelectric module, and a second metallized ceramic plate 30, which forms a hot side of the thermoelectric module.

The cold side of a thermoelectric module is the side that is configured to be in contact with the element to be cooled; it therefore absorbs heat. The hot side is the opposite side, which discharges (or releases) heat. Thus, in a thermoelectric module, heat circulates from the cold side to the hot side.

The thermoelectric module 22 is in this case configured so that the temperature difference between its cold side and its hot side is less than 10° C., and preferably equal to 0° C. A person skilled in the art will be able to find a compromise between the temperature difference and the power consumption of the thermoelectric module 22 depending on the applications which they are contemplating.

In this embodiment, a third passive heat sink 20 is in contact with the second metallized ceramic plate 30, that is to say with the hot side of the thermoelectric module 22. The third passive heat sink 20 is provided with fins and makes it possible to discharge the heat from the thermoelectric module 22 outward. The third passive heat sink is in this case made of aluminum.

In order to improve thermal dissipation still further, some embodiments, such as that illustrated by FIG. 6, comprise one or more forced-convection modules, for example, in this case, coupled to a passive heat sink. In the illustrated embodiment, a forced-convection module 32 is coupled to the fins of the third passive heat sink 20. In this case, the forced-convection module 32 is an air-convection module and comprises a fan.

Other embodiments covered by the invention comprise a different number of forced-convection modules, for example one or more modules coupled to at least some of the passive heat sinks, and/or comprise different forced-convection modules, that is to say which implement a fluid other than air, for example water or oil.

The image generation device 4 according to the invention is not limited to a thermoelectric module in the shape of a square (rectangular), such as that described above in connection with FIGS. 1 to 3. Concretely, the thermoelectric module 22 may be in contact with only part of the peripheral area of the downstream side of the partially transparent plate 21.

Thus, as FIG. 4 illustrates, the thermoelectric module 22 may cover the peripheral area only partially, for example, in this case, a region of the peripheral area running along only a single edge of the partially transparent plate 21.

According to another variant illustrated by FIG. 5, the image generation device 4 comprises two thermoelectric modules 32, 33 connected electrically in series, each in contact with part of the downstream side of the plate 21, in particular with a determined region of the peripheral area, in this case at an opposite edge of the partially transparent plate 21.

According to other variants, the thermoelectric module may comprise a different number of thermoelectric modules, for example three or four thermoelectric modules, and the heat sink and/or the thermoelectric modules may have any other shape suitable for the peripheral area, notably the shape of a corner or of an angle.

Although the presence of the first, second and third passive heat sinks 18, 19, 20 is particularly advantageous, the invention is not limited to their presence and some embodiments of the invention do not comprise these heat sinks, or comprise different heat sinks. Furthermore, although the heat sinks described above are heat sinks made of aluminum, the invention is compatible with heat sinks which comprise any other material which makes it possible to meet the heat-dissipation requirements which are described above, for example aluminum alloys or magnesium alloys.

In addition, the invention is not limited to an array of elements with variable transmittance in the form of a liquid-crystal display, but may take any other suitable form.

Various other modifications may be made to the invention within the scope of the appended claims.

The invention claimed is:

1. An image generation device comprising:

a light source configured to produce an upstream light beam; and an array of elements with variable transmittance, wherein the array of elements positioned between a first upstream polarizer forming an upstream side of the array of elements with variable transmittance, and a second downstream polarizer forming a downstream side of the array of elements with variable transmittance is configured to selectively receive and transmit the upstream light beam so as to form a downstream light beam forming an image, wherein the downstream side of the array of elements with variable transmittance, formed by the second downstream polarizer, is in contact with an upstream side of an at least partially transparent plate configured to limit heating of the array of elements with variable transmittance, and wherein a downstream side of the partially transparent plate is in contact with a cold side of a thermoelectric cooling module.

2. The image generation device as claimed in claim 1, wherein the thermoelectric cooling module is in contact with a peripheral area of the downstream side of the at least partially transparent plate so as to leave a central area of the at least partially transparent plate free, making it possible for the downstream light beam to pass.

3. The image generation device as claimed in claim 1, wherein the thermoelectric cooling module is in contact with a peripheral area of the downstream side of the at least partially transparent plate so as to delimit the central area.

4. The device as claimed in claim 2, comprising several thermoelectric cooling modules, wherein the cold sides of the thermoelectric cooling modules are in contact with the peripheral area of the downstream side of the partially transparent plate.

5. The device as claimed in claim 4, wherein the thermoelectric cooling modules are electrically coupled in series.

6. The device as claimed in claim 1, wherein the thermoelectric cooling module comprises a hot side opposite the cold side, wherein the hot side is in contact with a heat sink.

7. The device as claimed in claim 1, further comprising: an optical diffuser situated between the light source and the array of elements with variable transmittance, wherein the optical diffuser and the array of elements with variable transmittance are coupled to a heat sink, wherein the heat sink acts as a support for the optical diffuser and for the array of elements with variable transmittance.

8. The device as claimed in claim 1, wherein the at least partially transparent plate extends beyond the outlines of the array of elements with variable transmittance, and wherein the upstream side of the at least partially transparent plate is in contact with a heat sink that acts as a support.

9. The device as claimed in claim 1, wherein at least one heat sink is coupled to a forced-convection cooling module.

10. The device as claimed in claim 1, wherein the array of elements with variable transmittance is a liquid-crystal display.

11. The device as claimed in claim 1, wherein the at least partially transparent plate is an at least partially transparent ceramic plate.

12. A head-up display comprising an image generation device as claimed in claim 1.

* * * * *